March 3, 1942.   H. B. LEWIS   2,275,050
SUBFRAME FOR MOTOR VEHICLES
Filed Nov. 12, 1940
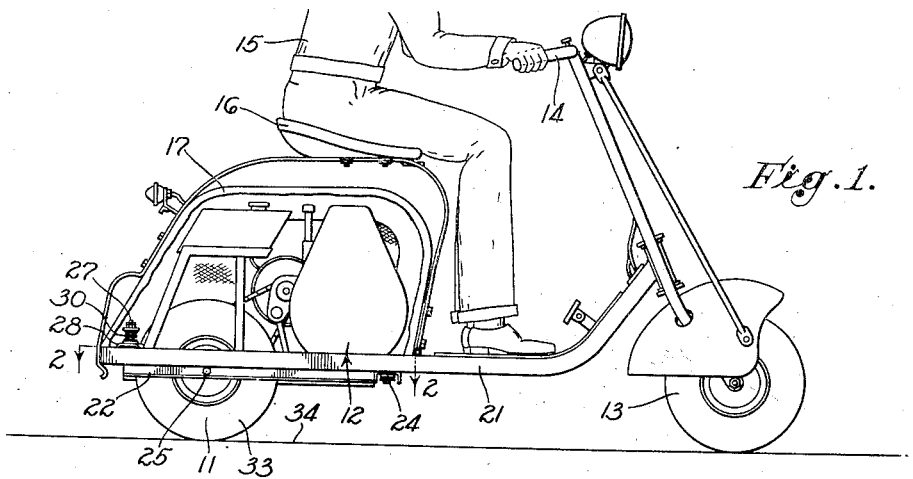
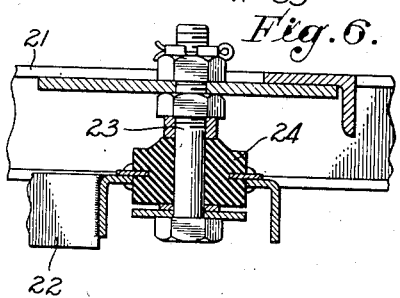
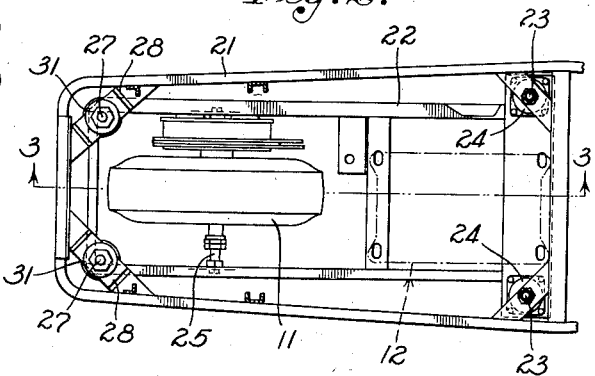
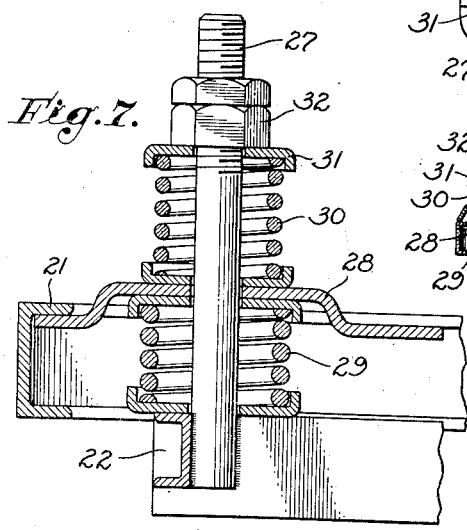
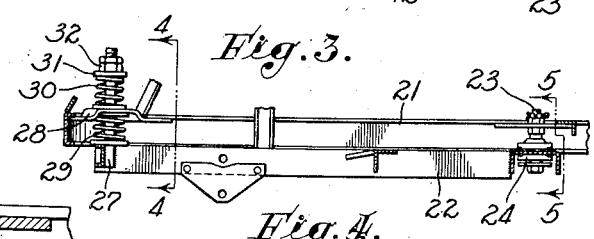
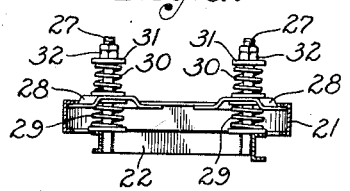
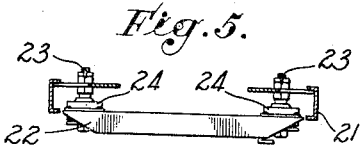
INVENTOR
HOWARD B. LEWIS
BY HARRIS, KIECH, FOSTER & HARRIS
ATTORNEYS.

Patented Mar. 3, 1942

2,275,050

UNITED STATES PATENT OFFICE 2,275,050

SUBFRAME FOR MOTOR VEHICLES

Howard B. Lewis, Venice, Calif., assignor to Salsbury Corporation, Los Angeles, Calif., a corporation of California Application November 12, 1940, Serial No. 365,146

1 Claim. (Cl. 180—32)

My invention relates to motor vehicles and is well adapted to be used on vehicles of the type later described herein.

The principal object of my invention is to provide means for minimizing road shocks for the purpose of adding to the comfort of the rider and reducing wear on the mechanism and tires of the vehicle.

Further objects and advantages will be made evident hereinafter.

Referring to the drawing, which is for illustrative purposes only:

Fig. 1 is a utility view of a motor drive vehicle incorporating my invention;

Fig. 2 is a plan view of my invention taken on the line 2—2 of Fig. 1;

Fig. 3 is a section taken on the line 3—3 of Fig. 2;

Fig. 4 is a section taken on the line 4—4 of Fig. 3;

Fig. 5 is a section taken on the line 5—5 of Fig. 3;

Fig. 6 is a vertical section illustrating the manner in which the auxiliary frame is supported near its forward end by the main frame; and Fig. 7 is a vertical section illustrating the suspension means at the rearward end of the auxiliary frame and the main frame.

My invention has a peculiar utility when applied to a vehicle of the type shown in the drawing. Such a vehicle has a driving wheel 11 which is driven by a motor 12 which is preferably an internal combustion engine. The vehicle also has a front or steering wheel 13 which is mounted in a fork having handles 14 by which the position of the wheel 13 is controlled for the purpose of steering. The rider 15 sits on a seat 16 which is carried on a hood 17. The hood 17 is supported on a main frame 21.

These vehicles are light in weight and of low first cost and can be operated at low expense. They have certain inherent disadvantages. For example, since the wheels are small the vehicles do not ride smoothly over rough roads. A small irregularity in the road surface which could be more easily surmounted by a larger wheel produces a heavy upward blow against the wheel. Such blows or road shocks are transmitted through the wheel to the vehicle itself and the reaction of the tire against the road depends upon the unsprung weight tending to hold the tire down. The wear on the tire and mechanism of the vehicle is a function of the violence produced by such road shocks. It is an object of the invention to provide means which permit the wheel to move upwardly against springs and thus reduce road shocks.

To accomplish this object I provide an auxiliary frame 22 which fits inside the main frame 21 and is supported near its forward end by bolts 23 which pass through rubber washers 24 against and through which forces generated in the auxiliary frame 22 are transmitted to the main frame 21. These rubber washers 24 tend to absorb shocks and provide a flexible connection between the auxiliary frame 22 and the main frame 21. The bolts 23 pass through the main frame 21 and clamp the auxiliary frame thereto through the washers 24. The motor 12 is rigidly mounted on the auxiliary frame 22 and drives the wheel 11 through a suitable transmission. The axle 25 of the wheel 11 is also fixed to the auxiliary frame 22.

Secured to the auxiliary frame 22 near the rear end thereof are two studs 27 which pass through gusset plates 28 of the main frame. A lower spring 29 is placed on each stud 27 below the plate 28, the springs 29 being compression springs each abutting on the main frame 21 at their upper ends and upon the auxiliary frame 22 at their lower ends. An upper spring 30 is placed on each of the studs 27 above the gusset plate 28. The springs 30 are also compression springs each abutting on the gusset plates 28 at their lower ends and each abutting at its upper end on a washer 31 which abuts on a nut 32 on the stud 27.

This spring suspension between the auxiliary frame 22 and the main frame 21 allows the rear end of the auxiliary frame 22 to move up or down with relation to the main frame 21, thus minimizing road shocks. Since the motor 12 is placed near the front end of the auxiliary frame 22, its inertia does not act directly on the axle 25 but at a long leverage thereon, so that the unsprung weight on the tire resides in the wheel, a part of the weight of the auxiliary frame, and a small part of the weight of the motor 12, and other parts.

Due to the above described arrangement of parts, road shocks and vibrations produced at the point of contact of the tire 33 on the road 34 are damped out by the springs 29 and 30 and the rubber suspension at the front end of the auxiliary frame 22. As a result these shocks and vibrations are not felt by the rider to the degree that they would be were such springs and suspension not provided. This point is very important, as these vehicles are commonly ridden several hours each day in messenger and similar service and shocks and vibrations are fatiguing and harmful to the rider. Also, by damping out these shocks and vibrations the power consumption of the vehicle and wear on vehicle parts are reduced.

The engines used in these vehicles produce considerable vibration and by mounting the engine on the auxiliary frame and supporting the rider on the main frame these vibrations are not transmitted through rigid connections to the rider, thus increasing his comfort by producing a much smoother riding vehicle.

I claim as my invention:

In a motor vehicle having a driving wheel which is driven by a motor through suitable mechanism, the combination of: a main frame; an auxiliary frame near the forward end of which said motor is supported and near the rear end of which the axle of said wheel is journalled; bolts passing through said auxiliary frame and said main frame near the forward end thereof; rubber washers on said bolts between said main frame and said auxiliary frame; studs attached to said auxiliary frame and passing through gusset plates on said main frame; helical compression springs carried on said studs between said gussets and said auxiliary frame; nuts, each threaded on the upper end of one of said studs; and helical compression springs carried on said studs between said gusset plates and said nuts.

HOWARD B. LEWIS.